(12) United States Patent
Palo et al.

(10) Patent No.: US 11,804,965 B2
(45) Date of Patent: Oct. 31, 2023

(54) CONNECTING CONFIGURATION SERVICES USING BLOCKCHAIN TECHNOLOGY

(71) Applicant: EMC IP Holding Company LLC, Hopkinton, MA (US)

(72) Inventors: Ashish Kumar Palo, Koraput (IN); Sathish Kumar Bikumala, Round Rock, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 132 days.

(21) Appl. No.: 17/230,542

(22) Filed: Apr. 14, 2021

(65) Prior Publication Data

US 2022/0337422 A1    Oct. 20, 2022

(51) Int. Cl.
*H04L 9/32* (2006.01)
*G06F 21/60* (2013.01)
*H04L 9/00* (2022.01)

(52) U.S. Cl.
CPC .......... *H04L 9/3239* (2013.01); *G06F 21/602* (2013.01); *H04L 9/50* (2022.05)

(58) Field of Classification Search
CPC ........ H04L 9/3239; H04L 9/50; G06F 21/602
See application file for complete search history.

(56) References Cited

U.S. PATENT DOCUMENTS

| 11,544,782 B2 * | 1/2023 | Cella ..................... G06Q 40/03 |
| 2017/0005804 A1 * | 1/2017 | Zinder ................. G06F 21/6254 |
| 2020/0349125 A1 * | 11/2020 | Earley ................... H04L 63/126 |
| 2021/0036883 A1 | 2/2021 | Ansari et al. |
| 2021/0067365 A1 | 3/2021 | Ansari et al. |
| 2022/0292202 A1 * | 9/2022 | Manevich ............. H04L 9/3247 |

OTHER PUBLICATIONS

Dell Inc., Perform real-time configuration updates directly inside our configuration center, https://i.dell.com/sites/csdocuments/Shared-Content_data-Sheets_Documents/en/us/Connected-Configuration-Datasheet.pdf, 2017.

* cited by examiner

*Primary Examiner* — Lynn D Feild
*Assistant Examiner* — Vladimir I Gavrilenko
(74) *Attorney, Agent, or Firm* — Ryan, Mason & Lewis, LLP

(57) ABSTRACT

Methods, apparatus, and processor-readable storage media for connecting configuration services using blockchain technology are provided herein. An example computer-implemented method includes obtaining at least one user request comprising configuration-related data pertaining to at least one item of hardware and at least one user network; encrypting at least a portion of the configuration-related data using one or more cryptographic hash functions; storing copies of the encrypted configuration-related data across multiple nodes within at least one distributed blockchain technology-based cloud storage system; and performing one or more automated actions, in connection with the at least one user request, using at least a portion of the stored data within the at least one distributed blockchain technology-based cloud storage system.

20 Claims, 6 Drawing Sheets

CONNECTING CONFIGURATION SERVICES USING BLOCKCHAIN TECHNOLOGY

FIELD

The field relates generally to information processing systems, and more particularly to techniques for providing security in such systems.

BACKGROUND

Conventional configuration services attempt to connect to a user's network as a way to enable obtained and/or purchased hardware to be connected to the user network for provisioning prior to delivery by an enterprise associated with the configuration services. However, such conventional services commonly rely on virtual private networks (VPNs) and third-party applications, which present various security and performance problems such as, for example, complex and manual troubleshooting requirements, delays in rolling out changes to user network devices due to slow VPN connections, data leakages due to VPN connection drops (potentially resulting in internet protocol (IP) address exposure, identity information exposure, etc.), lengthy configuration processing times, and potential for unauthorized data changes.

SUMMARY

Illustrative embodiments of the disclosure provide techniques for connecting configuration services using blockchain technology. An exemplary computer-implemented method includes obtaining at least one user request comprising configuration-related data pertaining to at least one item of hardware and at least one user network, and encrypting at least a portion of the configuration-related data using one or more cryptographic hash functions. The method also includes storing copies of the encrypted configuration-related data across multiple nodes within at least one distributed blockchain technology-based cloud storage system, and performing one or more automated actions, in connection with the at least one user request, using at least a portion of the stored data within the at least one distributed blockchain technology-based cloud storage system.

Illustrative embodiments can provide significant advantages relative to conventional configuration services. For example, problems associated with delays as well as security and performance issues are overcome in one or more embodiments through automating connected configuration services using blockchain technology.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
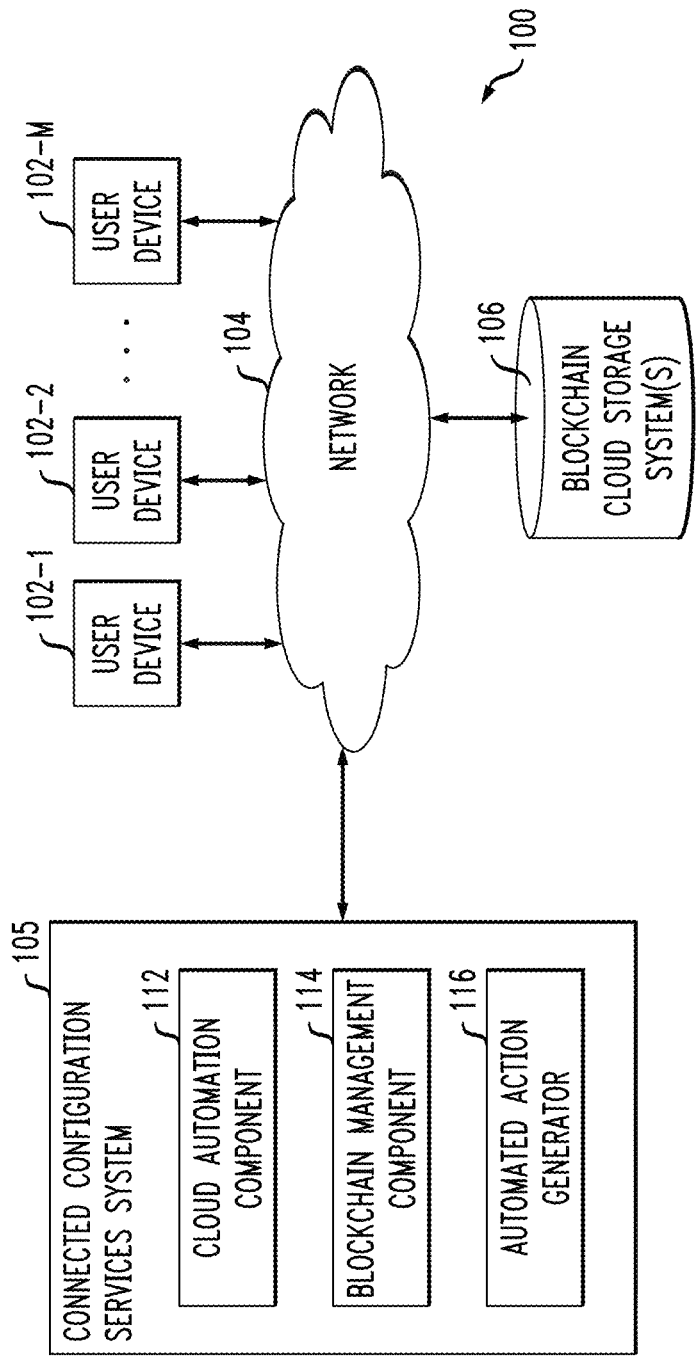
FIG. 1 shows an information processing system configured for connecting configuration services using blockchain technology in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is connected configuration services system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers." Additionally or alternatively, such user devices 102 can include devices attributed to and/or associated with cloud users and/or customers, as well as enterprise subject matter experts (SMEs) (e.g., customer executive sponsors, customer technical personnel, etc.).

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, connected configuration services system 105 can have at least one associated blockchain cloud storage system 106 configured to store data pertaining to configuration information associated with user devices (e.g., user devices 102) and various applications associated therewith, which comprise, for example, operating system (OS) images, update information, software information, etc.

The blockchain cloud storage system 106 in the present embodiment is implemented using one or more storage systems associated with connected configuration services system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with connected configuration services system 105 are one or more input-output devices, which illustratively comprise keyboards, displays or other types of input-output devices in any combination. Such input-output devices can be used, for example, to support one or more user interfaces to connected configuration services system 105, as well as to support communication between connected configuration services system 105 and other related systems and devices not explicitly shown.

Additionally, connected configuration services system 105 in the FIG. 1 embodiment is assumed to be implemented using at least one processing device. Each such processing device generally comprises at least one processor and an associated memory, and implements one or more functional modules for controlling certain features of connected configuration services system 105.

More particularly, connected configuration services system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows connected configuration services system 105 to communicate over the network 104 with the user devices 102, and illustratively comprises one or more conventional transceivers.

The connected configuration services system 105 further comprises a cloud automation component 112, a blockchain management component 114, and an automated action generator 116.

It is to be appreciated that this particular arrangement of elements 112, 114 and 116 illustrated in connected configuration services system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for connecting configuration services using blockchain technology involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, connected configuration services system 105 and blockchain cloud storage system(s) 106 can be on and/or part of the same processing platform.

An exemplary process utilizing elements 112, 114 and 116 of an example connected configuration services system 105 in computer network 100 will be described in more detail with reference to the flow diagram of FIG. 5.

Additionally, as further described herein, in accordance with one or more embodiments, one or more user devices 102 provide at least one request (including configuration-related data) to cloud automation component 112, which processes such request information and determines and executes a plan based thereon. The cloud automation component 112 then monitors and analyzes the execution of the plan, and based at least in part on the results of such monitoring and/or analysis, outputs data to blockchain management component 114. In one or more embodiments, cloud automation component 112 can include data storage wherein user/client data are maintained by a cloud provider instead of, or in addition to, storing such data on the user's/client's own legacy virtual memory system. Monitoring and analyzing carried out by cloud automation component 112, as noted above, can include observing and managing operational workflow(s) in a cloud-based information technology (IT) infrastructure to confirm the availability and/or performance, for example, of web sites, servers, applications, and/or other cloud infrastructure. Such continuous evaluation of resource levels, server response times, speeds, etc., can include and/or be used for predicting possible vulnerability to future issues before such issues arise.

In at least one embodiment, the blockchain management component 114 can include an open shared ledger, a consensus algorithm (e.g., a set of rules and/or arrangements to carry out one or more blockchain operations), a shared contract, and a cryptography component. Additionally, in one or more embodiments, a related blockchain can include one or more nodes (e.g., users and/or processing devices within the blockchain), one or more transactions (e.g., building blocks of the blockchain system), one or more blocks (e.g., data structures used for maintaining a set of transactions which is distributed to all nodes in the blockchain network), a chain (e.g., a sequence of blocks in a specific order), and one or more miners (e.g., specific nodes which perform a block verification process).

The blockchain management component 114 also interacts with a secure data storage layer (e.g., blockchain cloud storage system(s) 106) to generate and revert a response back to the one or more user devices 102 via the cloud automation component 112. Specifically, in one or more embodiments, the blockchain management component 114 can retrieve the data and/or obtain a response that a user needs to use via at least one smart contract function call. By way of example, whenever a user (e.g., an enterprise subject matter expert, an imaging administrator, a security administrator, a network administrator, etc.) attempts to fetch data, all chunks of the data are first validated, and if any alteration is found on a data chunk, then the miner who altered the data chunk is removed from the network, and that altered part of the data chunk is taken from another redundant copy. Thus, a user ultimately obtains original and identical copies of the data.

Accordingly, at least one embodiment includes connecting configuration services using blockchain technology. For example, such an embodiment can include generating and/or implementing a system that provides smart and secure connected configuration services to users for provisioning obtained and/or purchased hardware prior to delivery. In such an embodiment, a blockchain-integrated connected configuration service allows for the extension of a user's network to at least one enterprise configuration center, enabling obtained and/or purchased hardware (from the corresponding enterprise, for example) to be connected to the user network for provisioning prior to delivery for the completion of specific tasks such as, for example, domain joins, active directory management, application installations, etc.

As detailed herein, one or more embodiments include using cloud storage with blockchain technology to store data provided by users in such contexts (i.e., connected configuration contexts). Such an embodiment can also include using smart contracts (e.g., facilitating applications that run exactly as programmed without any possibility of downtime, censorship, fraud, or third-party interference).

In such an embodiment, a blockchain proxy layer is introduced to create a level of abstraction between the underlying core blockchain technology stack and one or more integrated applications and/or services. By way of illustration, consider a user case wherein a user places an order (online or offline) which is of a connected configuration type, using one of the integrated applications. Also, in such an example embodiment, a sales team, enterprise subject matter experts, and/or user technical personnel (e.g., imaging administrators, security administrators, network administrators, etc.) are participants of the network. Once the order is placed, the order can be processed via an order fulfillment system, and connected configuration orders can be sent from at least one factory to the back of factory for processing. Additionally, for the imaging process to take place, the user (e.g., via one or more user systems) transmits data over the cloud (as further detailed herein). To protect user security and/or privacy, specific levels of access that various parties have to the server can be designated (e.g., by the enterprise and/or one or more enterprise systems). Once processed in the back of factory, units (pertaining to the order) will be transmitted back to the factory to complete one or more merge operations (e.g., merging orders if a part of an order includes a given configuration type and another part of an order includes a given non-configuration type) and delivery to the user.

Accordingly, and as detailed herein, one or more embodiments include implementing blockchain-enabled cloud storage. In such an embodiment, distributed cloud storage is utilized where aspects of cloud storage (such as, for example, transport, processing, storage of data, etc.) are entered into the blockchain. Subsequently, what happens to the data can be verified by anyone who has requisite access to the blockchain. Accordingly, such an embodiment provides traceability, accountability, and transparency to the cloud. Further, at least one embodiment includes enabling users to store data in a secure and decentralized manner by using blockchain features such as ledgers, public/private key encryption, etc. The decentralized aspect ensures that there are no central servers to be compromised.

Additionally, in connection with one or more embodiments, a distributed cloud design provides resiliency (e.g., if some nodes fail, computation can continue on other nodes), efficiency (e.g., consistent network performance even if the nodes involved are heterogeneous), ease of deployment (e.g., nodes can be deployed in any configuration without disrupting other nodes), adaptability (e.g., the architecture of the network can adapt to changing environments and broaden its use to meet variable needs and/or demands of users), linear performance, and security (e.g., via data protection, confidentiality and information security).

Figure 2:
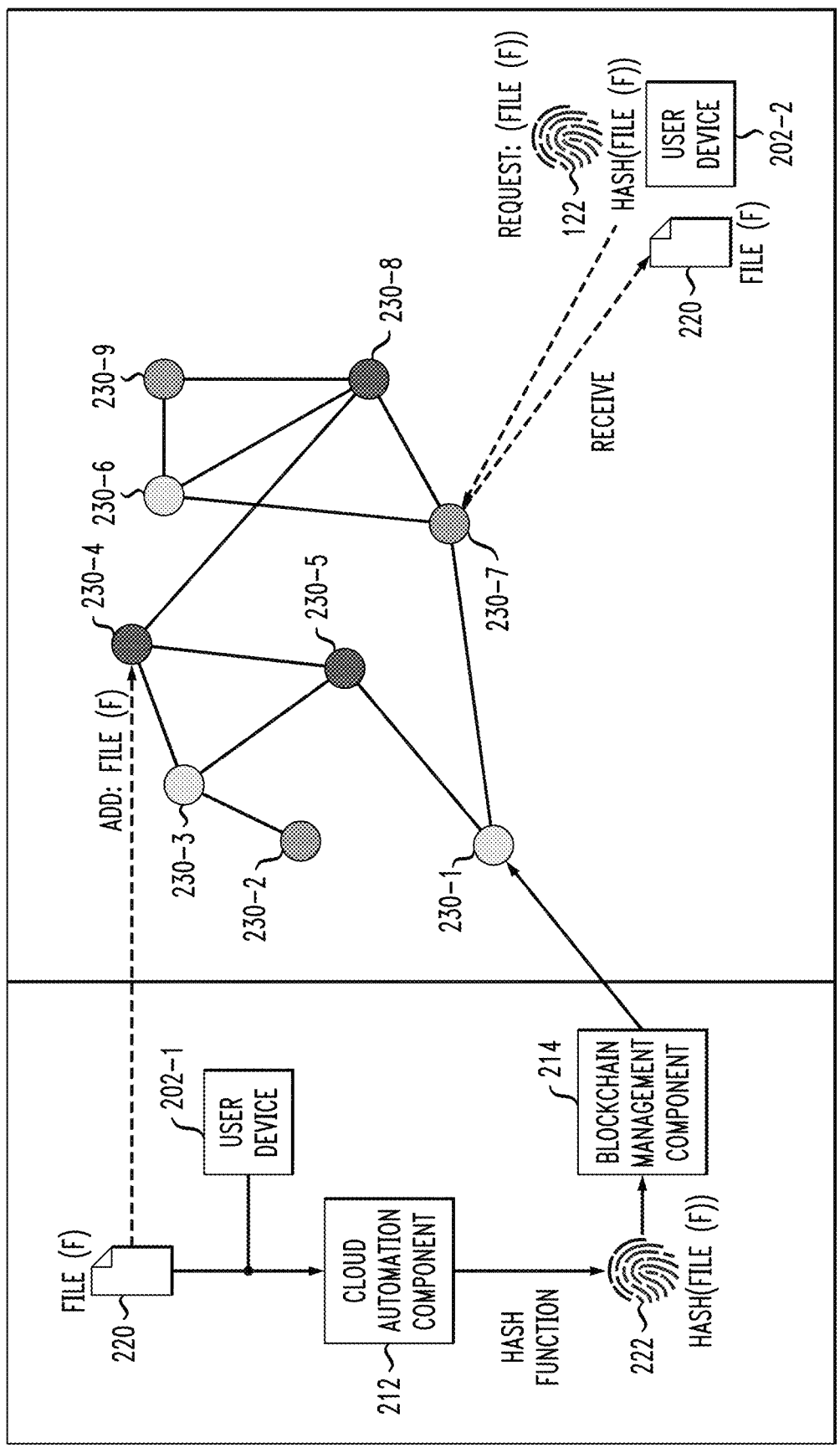
FIG. 2 shows an example InterPlanetary File System (IPFS) protocol in an illustrative embodiment.

FIG. 2 shows an example IPFS protocol in an illustrative embodiment. By way of illustration, FIG. 2 depicts user device 202-1, which may include, e.g., a customer who has placed an order of a given configuration type, and/or an enterprise subject matter expert attempting to fulfill a given requirement, and a file (F) 220 related to an action of user device 202-1 that is provided to and/or obtained by cloud automation component 212. In an example embodiment, user device 202-1 can represent a customer who is attempting to push the content (e.g., file (F) 220) to cloud storage.

Cloud automation component 212 performs a hash function (e.g., at least one SHA-256 algorithm) on file (F) 220, creating hash(file (F)) 222 (i.e., a hash of file (F) 220), which is provided to blockchain management component 214. A hash function such as a SHA-256 algorithm can be used, for example, in a blockchain to generate a constant hash of 256 bits for every given instance. Blockchain management component 214 processes hash(file (F)) 222 and, using a distributed hash table, stores and/or distributes at least a portion of hash(file (F)) 222 across multiple blocks and/or nodes (e.g., nodes 230-1, 230-2, 230-3, 230-4, 230-5, 230-6, 230-7, 230-8, and 230-9) of a blockchain network.

As also illustrated in FIG. 2, user device 202-2 submits a request to the blockchain network which includes a copy of hash(file (F)) 222. By submitting the request in conjunction with the copy of hash(file (F)) 222 to blockchain node 230-7, user device 202-2 receives a response which includes a copy of file (F) 220 (which has been provided to the blockchain network).

Accordingly, as depicted in the example embodiment of FIG. 2, a user's file can be encrypted and stored across multiple peers in the network using a peer-to-peer filesystem protocol such as, for example, the IPFS protocol, the ZeroNet protocol, the Freenet protocol, the I2P protocol, etc. By way of illustration, the IPFS protocol creates at least one hash value which indicates the path of the file and is stored in the blockchain. By encrypting the data using at least one algorithm (e.g., the RSA asymmetric cryptographic algorithm, the advanced encryption standard (AES), the Blowfish symmetric encryption algorithm, etc.) and distributing the data across multiple nodes, a high level of data security can be achieved.

Transaction details are stored in the blocks of the blockchain, and are chained to each other serially using the concept of hashing. Additionally, every peer involved in the network has a copy of the blockchain to verify the credibility of the blockchain. For example, transactions involving providing access to users and storing data will be allowed, and the user who owns the data can set the permission level of the users involved in the chain. Accordingly, such an embodiment includes implementing a trusted peer-to-peer network maintaining a distributed ledger that comprises validating nodes that update the ledger and respond to requests. Requests can be invoked, for example, through client software development kits (SDKs) and/or representational state transfer (REST) application programming interface (API) calls. Multiple peers can endorse and/or sign the results, which are then verified and sent to the ordering service. After consensus is reached on the order, results are grouped into cryptographically secured, tamper-proof data blocks and sent to peer nodes to be validated and appended to the ledger.

Additionally, in one or more embodiments, data redundancy and load balancing mechanisms can be applied for availability and access. Whenever a user (e.g., enterprise SME(s), imaging administrator(s), security administrator(s), network administrator(s), etc.) attempts to fetch data, chunks of the data are first validated and if any alteration is found on a data chunk, then the node which altered the data chunk is removed from the network, and that altered portion of the data is taken from another redundant copy. Thus, a user gets original and identical copies of the data.

Figure 3:
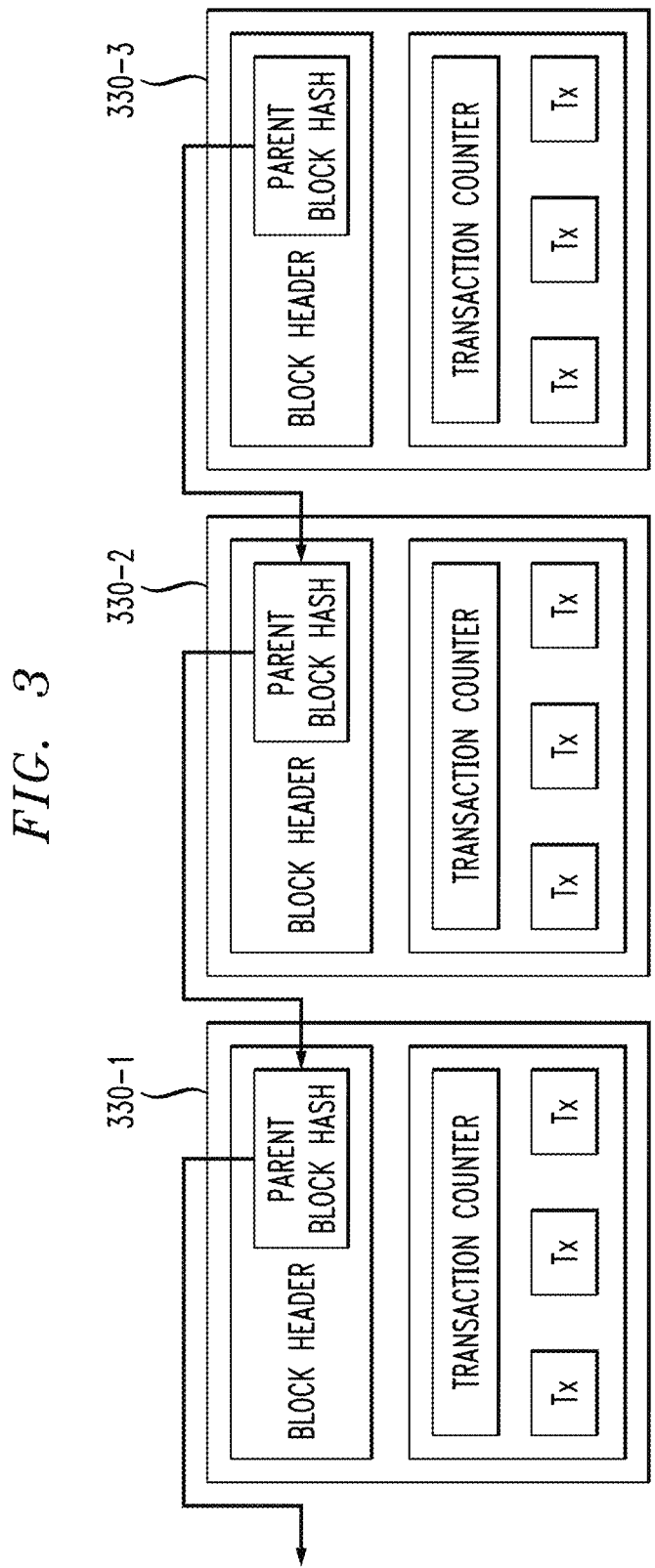
FIG. 3 shows example blockchain architecture in an illustrative embodiment.

FIG. 3 shows example blockchain architecture in an illustrative embodiment. By way of illustration, FIG. 3 depicts blocks 330-1, 330-2, and 330-3, each of which includes a block header (which further includes a parent block hash) and a transaction counter component (in connection with multiple items of transaction data (Tx)). Specifically, FIG. 3 illustrates the working of an example blockchain. A block header is used to identify a particular block on the blockchain, and such a block header can be hashed repeatedly to create proof of work for mining rewards.

As detailed herein, a blockchain (such as the example blockchain of FIG. 3) includes a series of various blocks (e.g., blocks 330-1, 330-2, and 330-3) that are used to store information related to transactions that occur on a blockchain network. In at least one embodiment, each of the blocks contains a unique header, and each such block is identified by its block header hash individually. The block header, in such an embodiment, contains multiple (e.g., three) sets of block metadata. Such metadata can include, for example, an 80-byte long string, comprised of a 4-byte long version number, a 32-byte previous block hash, 32-byte long Merkle root, a 4-byte long timestamp of the block, a 4-byte long difficulty target for the block, and a 4-byte long nonce used by miners.

Figure 4:
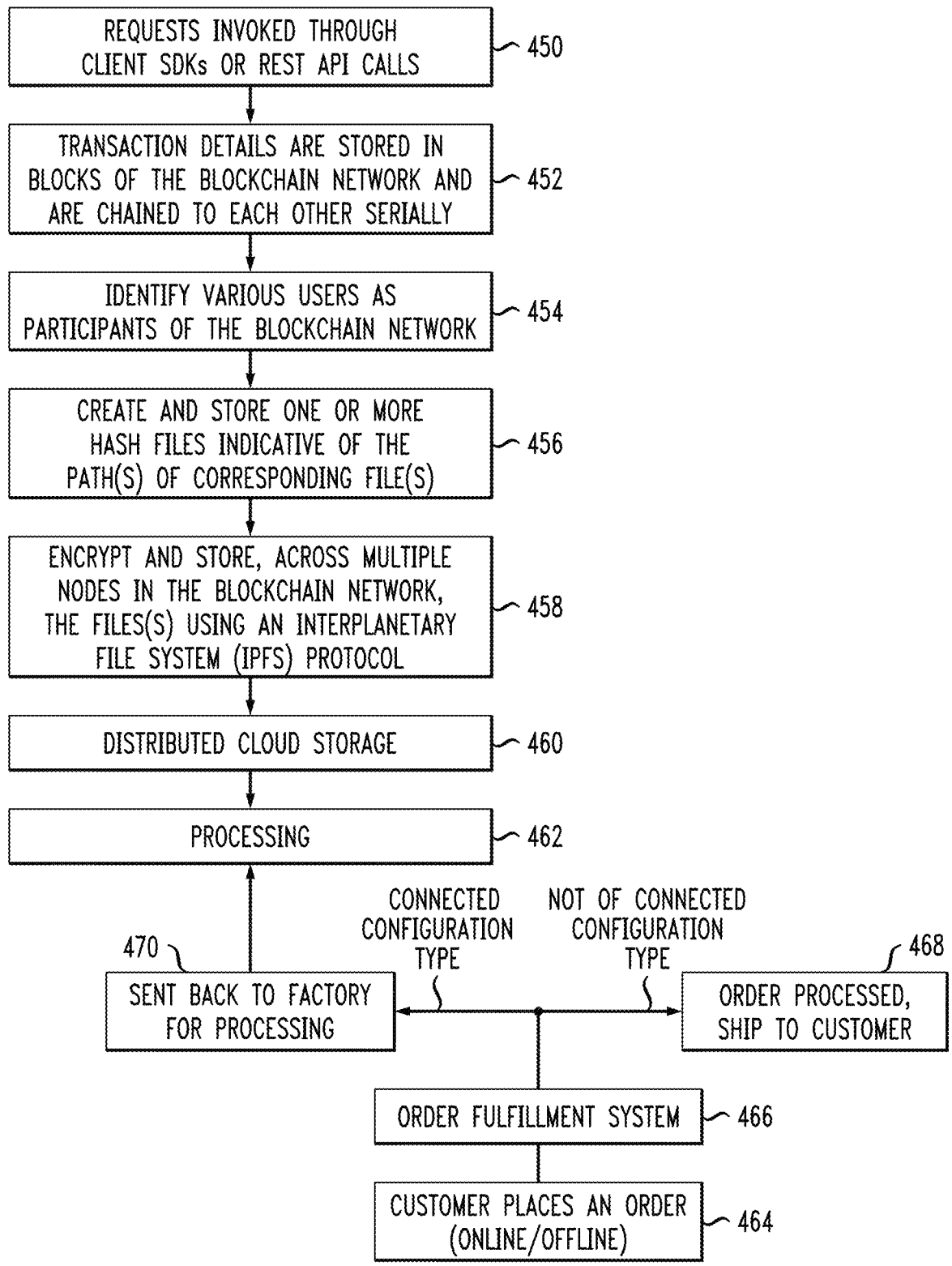
FIG. 4 shows an example workflow in an illustrative embodiment.

FIG. 4 shows an example workflow in an illustrative embodiment. Step 450 includes a user and/or user device invoking a request, pertaining to a transaction, through one or more client SDKs and/or one or more REST API calls. Step 452 includes storing transaction details in various blocks of a blockchain network, and chaining the transaction details to each other serially (e.g., using the concept of hashing). Additionally, in one or more embodiments, every peer involved in the blockchain network maintains a copy of blockchain to verify the credibility of the blockchain. Step 454 includes identifying and/or designating various users (e.g., enterprise SMEs, imaging administrators, security administrators, network administrators, end users, customers, etc.) as participants of the blockchain network.

Additionally, step 456 includes using an IPFS protocol to create a hash value pertaining to a file associated with the transaction in question, wherein the hash value indicates the path of the file and is stored in the blockchain network. Step 458 includes encrypting the file and storing, via at least one distributed cloud storage system 460, at least portions of the encrypted file across multiple peers in the blockchain network using the IPFS protocol.

As also depicted in FIG. 4, a user and/or customer places an order (online or offline) in step 464, wherein the order is processed by an order fulfillment center 466. Based on such processing, if it is determined that the order is not of a connected configuration type, the order is processed and/or shipped to the user/customer in step 468. If, alternatively, it is determined that the order is of a connected configuration type, the order is sent back to the factory in step 470, wherein the order undergoes further processing in step 462, and wherein such processing (in step 462) can be carried out using inputs from the at least one distributed cloud storage system 460 (as detailed above).

As detailed herein, one or more embodiments include leveraging blockchain technology to secure user configuration data pertaining, for example, to software applications, images, and/or sensitive data such as from users and/or customers. Additionally, such an embodiment can include enabling bulk application (as opposed to batch application) of configuration on user and/or client devices, as well as implementing at least one security layer for one or more services.

Also, at least one embodiment includes providing increased transparency, as information in a blockchain network is viewable by all participants and cannot be altered (which reduces risk and fraud and creates trust), as well as limiting and/or reducing the number of intermediaries (as blockchain technology provides a peer-to-peer network that reduces reliance on third parties). Additionally, blockchain technology can speed-up process execution in multi-party scenarios and enable faster transactions that are not limited by standard business hours.

Figure 5:
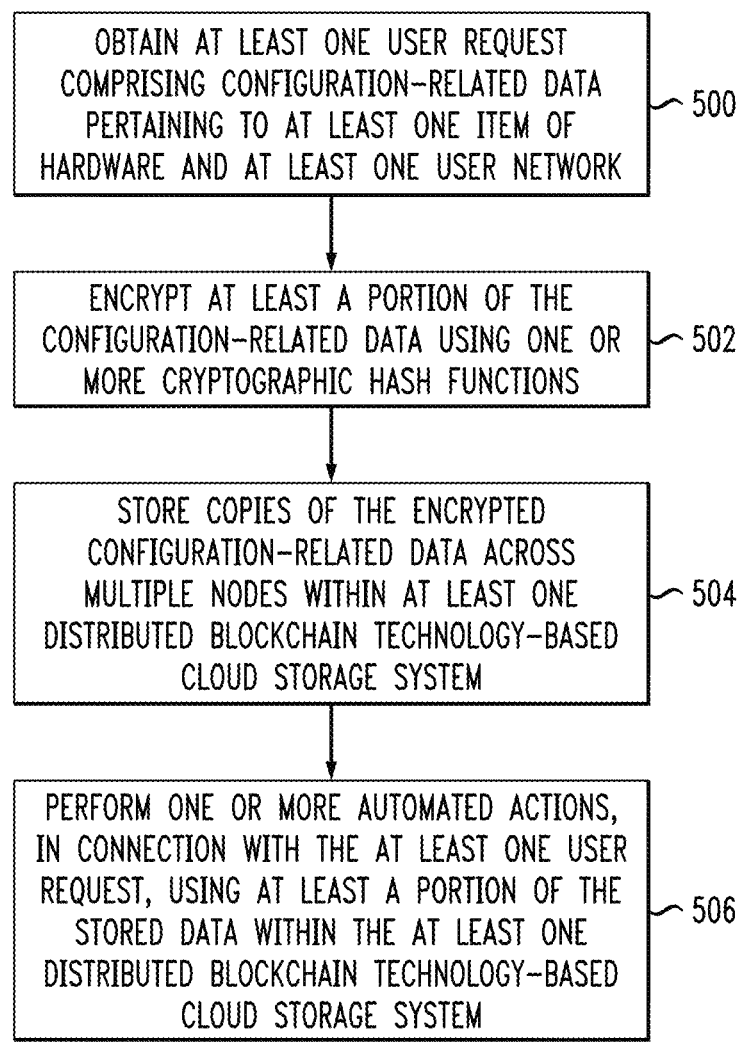
FIG. 5 is a flow diagram of a process for connecting configuration services using blockchain technology in an illustrative embodiment.

FIG. 5 is a flow diagram of a process for connecting configuration services using blockchain technology in an illustrative embodiment. It is to be understood that this particular process is only an example, and additional or alternative processes can be carried out in other embodiments.

In this embodiment, the process includes steps 500 through 506. These steps are assumed to be performed by the connected configuration services system 105 utilizing its elements 112, 114 and 116.

Step 500 includes obtaining at least one user request comprising configuration-related data pertaining to at least one item of hardware and at least one user network. In one or more embodiments, obtaining at least one user request includes obtaining the at least one user request via at least one of one or more client SDKs and one or more REST API calls.

Step 502 includes encrypting at least a portion of the configuration-related data using one or more cryptographic hash functions. In at least one embodiment, encrypting at least a portion of the configuration-related data includes creating at least one hash value, wherein the at least one hash value indicates a path in the blockchain associated with the encrypted configuration-related data. Additionally or alternatively, encrypting at least a portion of the configuration-related data using one or more cryptographic hash functions can include encrypting at least a portion of the configuration-related data using at least one of an asymmetric cryptographic algorithm and a symmetric encryption algorithm.

Step 504 includes storing copies of the encrypted configuration-related data across multiple nodes within at least one distributed blockchain technology-based cloud storage system. In one or more embodiments, storing copies of the encrypted configuration-related data across multiple nodes includes storing the copies of the encrypted configuration-related data using at least one IPFS protocol.

Step 506 includes performing one or more automated actions, in connection with the at least one user request, using at least a portion of the stored data within the at least one distributed blockchain technology-based cloud storage system. In at least one embodiment, performing the one or more automated actions includes automatically connecting to the at least one user network and performing one or more configuration modifications related to the at least one user network. Such an embodiment can also include deploying the at least one item of hardware to the at least one user network subsequent to performing the one or more configuration modifications related to the at least one user network. For example, such deploying can include delivering the given hardware to the at least one user network, appropriately configured for the hardware, for installation on the at least one user network.

The techniques depicted in FIG. 5 can also include setting, in response to input from the user, multiple distinct levels of access to the encrypted configuration-related data for multiple categories of blockchain participant.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automate connecting configuration services using blockchain technology. These and other embodiments can effectively overcome problems associated with delays as well as security and performance issues.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
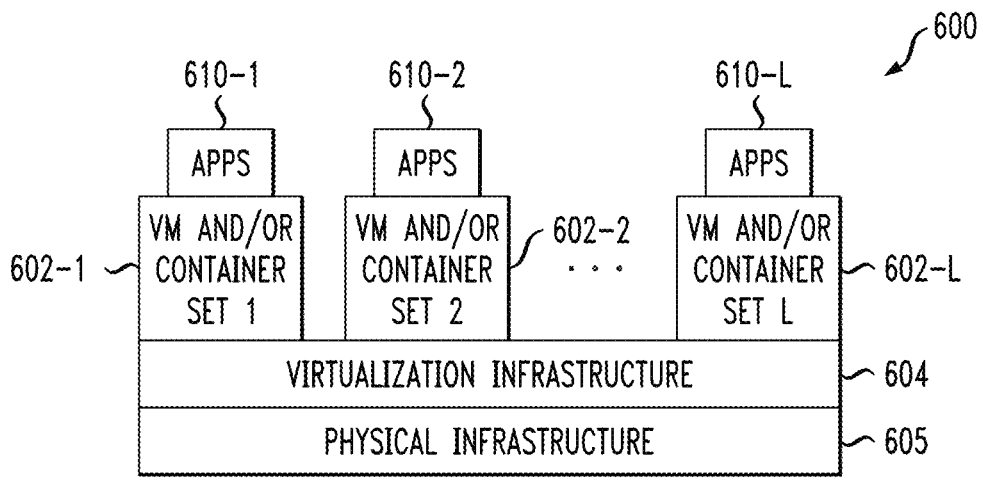
FIGS. 6 and 7 show examples of processing platforms that may be utilized to implement at least a portion of an information processing system in illustrative embodiments.
Figure 7:
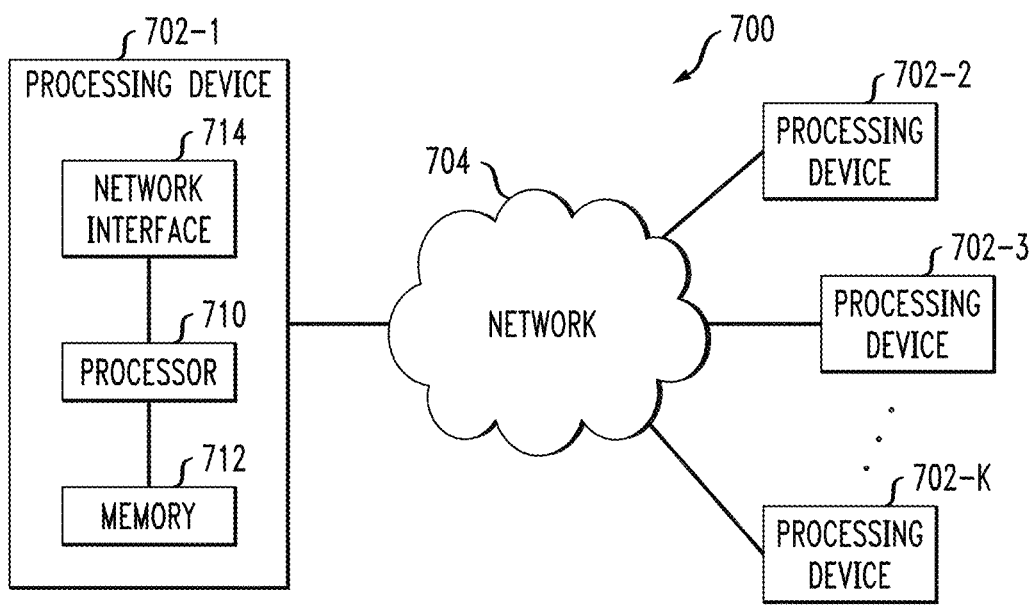

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining at least one user request comprising configuration-related data pertaining to at least one item of hardware and at least one user network;
encrypting at least a portion of the configuration-related data using one or more cryptographic hash functions, wherein encrypting at least a portion of the configuration-related data comprises creating at least one hash value associated with the encrypted configuration-related data, wherein the at least one hash value is based at least in part on a path across multiple nodes within at least one distributed blockchain technology-based cloud storage system;
storing, in accordance with the path, copies of the encrypted configuration-related data across the multiple nodes within the at least one distributed blockchain technology-based cloud storage system; and
performing one or more automated actions, in connection with the at least one user request, using at least a portion of the stored data within the at least one distributed blockchain technology-based cloud storage system, wherein performing the one or more automated actions comprises deploying the at least one item of hardware to the at least one user network subsequent to performing, based at least in part on the at least a portion of the stored data, one or more configuration modifications to at least one of the at least one item of hardware and the at least one user network;
wherein the method is performed by at least one processing device comprising a processor coupled to a memory.

2. The computer-implemented method of claim 1, wherein performing the one or more automated actions comprises automatically connecting to the at least one user network and performing one or more configuration modifications related to the at least one user network.

3. The computer-implemented method of claim 1, wherein storing copies of the encrypted configuration-related data across multiple nodes comprises storing the copies of the encrypted configuration-related data using at least one InterPlanetary File System (IPFS) protocol.

4. The computer-implemented method of claim 1, further comprising:
setting, in response to input from the user, multiple distinct levels of access to the encrypted configuration-related data for multiple categories of blockchain participant.

5. The computer-implemented method of claim 1, wherein encrypting at least a portion of the configuration-related data using one or more cryptographic hash functions comprises encrypting at least a portion of the configuration-related data using at least one of an asymmetric cryptographic algorithm and a symmetric encryption algorithm.

6. The computer-implemented method of claim 1, wherein obtaining at least one user request comprises obtaining the at least one user request via at least one of one or more client software development kits (SDKs) and one or more representational state transfer (REST) application programming interface (API) calls.

7. A non-transitory processor-readable storage medium having stored therein program code of one or more software programs, wherein the program code when executed by at least one processing device causes the at least one processing device:
to obtain at least one user request comprising configuration-related data pertaining to at least one item of hardware and at least one user network;
to encrypt at least a portion of the configuration-related data using one or more cryptographic hash functions, wherein encrypting at least a portion of the configuration-related data comprises creating at least one hash value associated with the encrypted configuration-related data, wherein the at least one hash value is based at least in part on a path across multiple nodes within at least one distributed blockchain technology-based cloud storage system;
to store, in accordance with the path, copies of the encrypted configuration-related data across the multiple nodes within the at least one distributed blockchain technology-based cloud storage system; and
to perform one or more automated actions, in connection with the at least one user request, using at least a portion of the stored data within the at least one distributed blockchain technology-based cloud storage system, wherein performing the one or more automated actions comprises deploying the at least one item of hardware to the at least one user network subsequent to performing, based at least in part on the at least a portion of the stored data, one or more configuration modifications to at least one of the at least one item of hardware and the at least one user network.

8. The non-transitory processor-readable storage medium of claim 7, wherein performing the one or more automated actions comprises automatically connecting to the at least one user network and performing one or more configuration modifications related to the at least one user network.

9. The non-transitory processor-readable storage medium of claim 7, wherein storing copies of the encrypted configuration-related data across multiple nodes comprises storing the copies of the encrypted configuration-related data using at least one IPFS protocol.

10. The non-transitory processor-readable storage medium of claim 7, wherein the program code when executed by the at least one processing device causes the at least one processing device:
to set, in response to input from the user, multiple distinct levels of access to the encrypted configuration-related data for multiple categories of blockchain participant.

11. The non-transitory processor-readable storage medium of claim 7, wherein encrypting at least a portion of the configuration-related data using one or more cryptographic hash functions comprises encrypting at least a portion of the configuration-related data using at least one of an asymmetric cryptographic algorithm and a symmetric encryption algorithm.

12. An apparatus comprising:
at least one processing device comprising a processor coupled to a memory;
the at least one processing device being configured:
to obtain at least one user request comprising configuration-related data pertaining to at least one item of hardware and at least one user network;
to encrypt at least a portion of the configuration-related data using one or more cryptographic hash functions, wherein encrypting at least a portion of the configuration-related data comprises creating at least one hash value associated with the encrypted configuration-related data, wherein the at least one hash value is based at least in part on a path across multiple nodes within at least one distributed blockchain technology-based cloud storage system;

to store, in accordance with the path, copies of the encrypted configuration-related data across the multiple nodes within the at least one distributed blockchain technology-based cloud storage system; and to perform one or more automated actions, in connection with the at least one user request, using at least a portion of the stored data within the at least one distributed blockchain technology-based cloud storage system, wherein performing the one or more automated actions comprises deploying the at least one item of hardware to the at least one user network subsequent to performing, based at least in part on the at least a portion of the stored data, one or more configuration modifications to at least one of the at least one item of hardware and the at least one user network.

13. The apparatus of claim 12, wherein performing the one or more automated actions comprises automatically connecting to the at least one user network and performing one or more configuration modifications related to the at least one user network.

14. The apparatus of claim 12, wherein storing copies of the encrypted configuration-related data across multiple nodes comprises storing the copies of the encrypted configuration-related data using at least one IPFS protocol.

15. The apparatus of claim 12, wherein the at least one processing device is further configured:

to set, in response to input from the user, multiple distinct levels of access to the encrypted configuration-related data for multiple categories of blockchain participant.

16. The apparatus of claim 12, wherein encrypting at least a portion of the configuration-related data using one or more cryptographic hash functions comprises encrypting at least a portion of the configuration-related data using at least one of an asymmetric cryptographic algorithm and a symmetric encryption algorithm.

17. The apparatus of claim 12, wherein obtaining at least one user request comprises obtaining the at least one user request via at least one of one or more client SDKs and one or more REST API calls.

18. The apparatus of claim 12, wherein storing copies of the encrypted configuration-related data comprises storing transaction details associated with the at least one user request across the multiple nodes within the at least one distributed blockchain technology-based cloud storage system, and chaining the stored transaction details to each other serially.

19. The computer-implemented method of claim 1, wherein storing copies of the encrypted configuration-related data comprises storing transaction details associated with the at least one user request across the multiple nodes within the at least one distributed blockchain technology-based cloud storage system, and chaining the stored transaction details to each other serially.

20. The non-transitory processor-readable storage medium of claim 7, wherein storing copies of the encrypted configuration-related data comprises storing transaction details associated with the at least one user request across the multiple nodes within the at least one distributed blockchain technology-based cloud storage system, and chaining the stored transaction details to each other serially.

\* \* \* \* \*